United States Patent
Robinson et al.

(10) Patent No.: US 9,420,113 B1
(45) Date of Patent: Aug. 16, 2016

(54) SYSTEMS AND METHODS FOR INSTALLING IP PHONES

(71) Applicants: Nicholas Lee Robinson, Huntsville, AL (US); Ashley Wayne Armstrong, Huntsville, AL (US)

(72) Inventors: Nicholas Lee Robinson, Huntsville, AL (US); Ashley Wayne Armstrong, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 87 days.

(21) Appl. No.: 14/249,274

(22) Filed: Apr. 9, 2014

(51) Int. Cl.
*H04L 12/28* (2006.01)
*H04M 7/00* (2006.01)

(52) U.S. Cl.
CPC .................................. *H04M 7/0075* (2013.01)

(58) Field of Classification Search
None
See application file for complete search history.

(56) References Cited

U.S. PATENT DOCUMENTS

| | | | | |
|---|---|---|---|---|
| 7,706,359 B2* | 4/2010 | Pounds | ................... | H04L 12/66 370/353 |
| 7,945,036 B1* | 5/2011 | Tonogai | ............... | H04Q 3/0045 379/201.01 |
| 8,938,061 B1* | 1/2015 | Dendy | .............. | H04M 3/42153 370/401 |
| 2001/0026545 A1 | 10/2001 | Matsumoto et al. | | |
| 2004/0042461 A1 | 3/2004 | Nasiri et al. | | |
| 2007/0217434 A1 | 9/2007 | Welbourn | | |
| 2011/0026516 A1 | 2/2011 | Roberts et al. | | |
| 2011/0305238 A1* | 12/2011 | Ikuta | .................. | H04L 65/4076 370/352 |

OTHER PUBLICATIONS

Dendy, et al., U.S. Appl. No. 13/538,864, entitled, "Systems and Methods for Configuring and Registering Internet Protocol (IP) Phones," filed Jun. 29, 2012.

* cited by examiner

*Primary Examiner* — Frank Duong

(74) *Attorney, Agent, or Firm* — Maynard Cooper & Gale, P.C.; Jon E. Holland

(57) ABSTRACT

An Internet protocol (IP) phone is installed in a private branch exchange (PBX) system without a user having to manually correlate the phone's media access control (MAC) address with the phone's extension identifier. In this regard, the PBX is configured to automatically learn the phone's MAC address and correlate such address with an extension identifier entered by the user. Thus, the phone can be installed for use with the PBX system with reduced complexity and burdens for the user.

23 Claims, 7 Drawing Sheets

SYSTEMS AND METHODS FOR INSTALLING IP PHONES

RELATED ART

A private branch exchange (PBX) system is often used to serve as a telephone exchange for offices of a particular business or organization. An internet protocol (IP) PBX system stores configuration files for specific phone models and phone extensions, and such configuration files are often described or identified by a unique media access control (MAC) address of the phone. Each phone in the PBX system typically requires a unique extension identifier. Thus, an association between the MAC address of a given phone and its extension identifier is needed.

During phone installation and configuration, an administrator often makes such association between the phone's MAC address and extension identifier by submitting manual inputs through a PBX system graphical user interface (GUI). However, such process is typically time-consuming, particularly for PBX systems serving large organizations. Thus, the process of distributing phones to the offices of the organization serviced by the PBX system and determining which phone is actually installed in a given office so that its MAC address can be correctly associated with its extension identifier is burdensome to an administrator and prone to errors.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several views.

DETAILED DESCRIPTION

Throughout this description, embodiments and variations are described for the purpose of illustrating uses and implementations of inventive concepts. The illustrative description should be understood as presenting examples of inventive concepts, rather than as limiting the scope of the concepts as disclosed herein. It should be further understood that certain words and terms are used herein solely for convenience and such words and terms should be interpreted as referring to various objects and actions that are generally understood in various forms and equivalencies by persons of ordinary skill in the art. For example, the word "PBX" generally pertains to a private branch exchange. More particularly, in various embodiments described below the PBX pertains to an IP PBX in view of the fact that the phones referred to herein are IP phones. However, certain concepts that are described below may be applied to various other types of PBXs and telephones as well.

Furthermore, the word "example" as used herein is intended to be non-exclusionary and non-limiting in nature. More particularly, the word "exemplary" as used herein indicates one among several examples, and it must be understood that no extraordinary emphasis or preference is being directed to the particular example being described.

Turning now to a general description of the disclosure, the various exemplary embodiments described herein are generally directed to systems and methods pertaining to installing one or more IP phones on a PBX system, and more particularly, to reconfiguring an IP phone that is in a temporary default configuration into a permanent user-specific configuration when the IP phone is installed on the PBX system in accordance with the disclosure.

Figure 1:
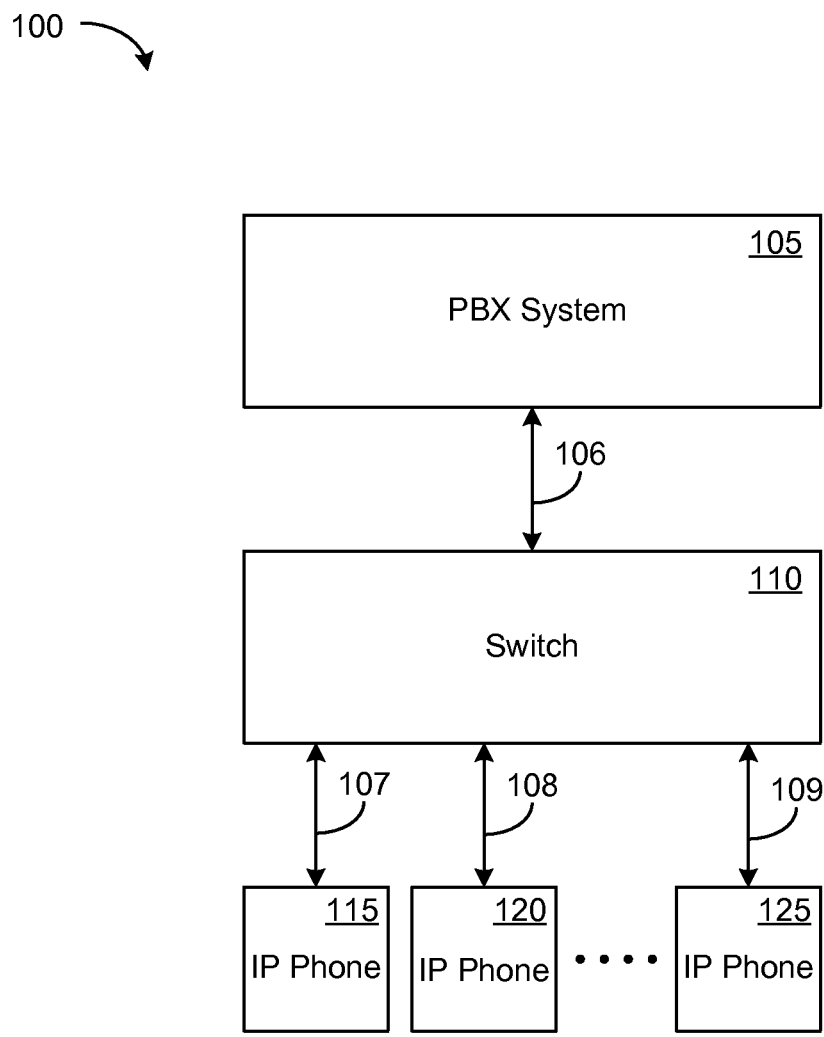
FIG. 1 shows an exemplary embodiment of a communication system that may incorporate a PBX system in accordance with the disclosure.

FIG. 1 depicts an exemplary embodiment of a communication system 100 that includes a PBX system 105 coupled to a switch 110. One or more IP phones are coupled to the switch 110 in order to enable communicative coupling between the one or more IP phones and the PBX system 105. In this exemplary embodiment, "N" IP phones can be coupled to the switch 110, where N≥1.

In many conventional PBX systems, such as an Ethernet-based PBX system, an IP phone's MAC address must be correlated with its extension identifier in the PBX system. In many cases, an installer manually enters a phone's MAC address using a graphical user interface (GUI) provided by the PBX system and then performs such correlation. In such case, it is necessary that the MAC address of the IP phone be known by the installer who must ensure that the IP phone correlated to a particular extension identifier is actually installed at the physical location for such extension identifier. Not only is it necessary for the installer to know the MAC address, but the installer must also know how to program the PBX system to correlate the MAC address of the IP phone with the proper extension identifier. While this prior installation process may be deemed acceptable for installing a small number of phones, as can be appreciated, such an installation process becomes cumbersome and error-prone when a large number of IP phones have to be installed on a PBX system.

In contrast, each of the "N" IP phones shown in FIG. 1 can be individually installed using an automated installation process at any arbitrary time when a user chooses to couple his/her IP phone to the switch 110. The PBX automatically learns the IP phone's MAC address and correlates such MAC address with an extension identifier that is provided by a user. Thus, an installer need not know the IP phone's MAC address. Thus, any IP phone of a desired model or type may be installed and correlated with a given user's extension identifier such that it is unnecessary to ensure that a phone having a specific MAC address is installed at a given location.

The switch 110 can be any one of a variety of switches based on an architectural preference for the communication system 100. In the exemplary embodiment described herein, the switch 110 is a Layer 2 switch, such as an Ethernet switch that forwards packets using MAC addresses. The switch 110 operates cooperatively with the PBX system 105 to provide communications interconnectivity (such as voice calls) between the various IP phones (the IP phone 115, the IP phone 120, the IP phone 125 etc.), and may also provide communications interconnectivity with IP phones and other external devices (not shown) that are communicatively coupled to the communication system 100.

Figure 2:
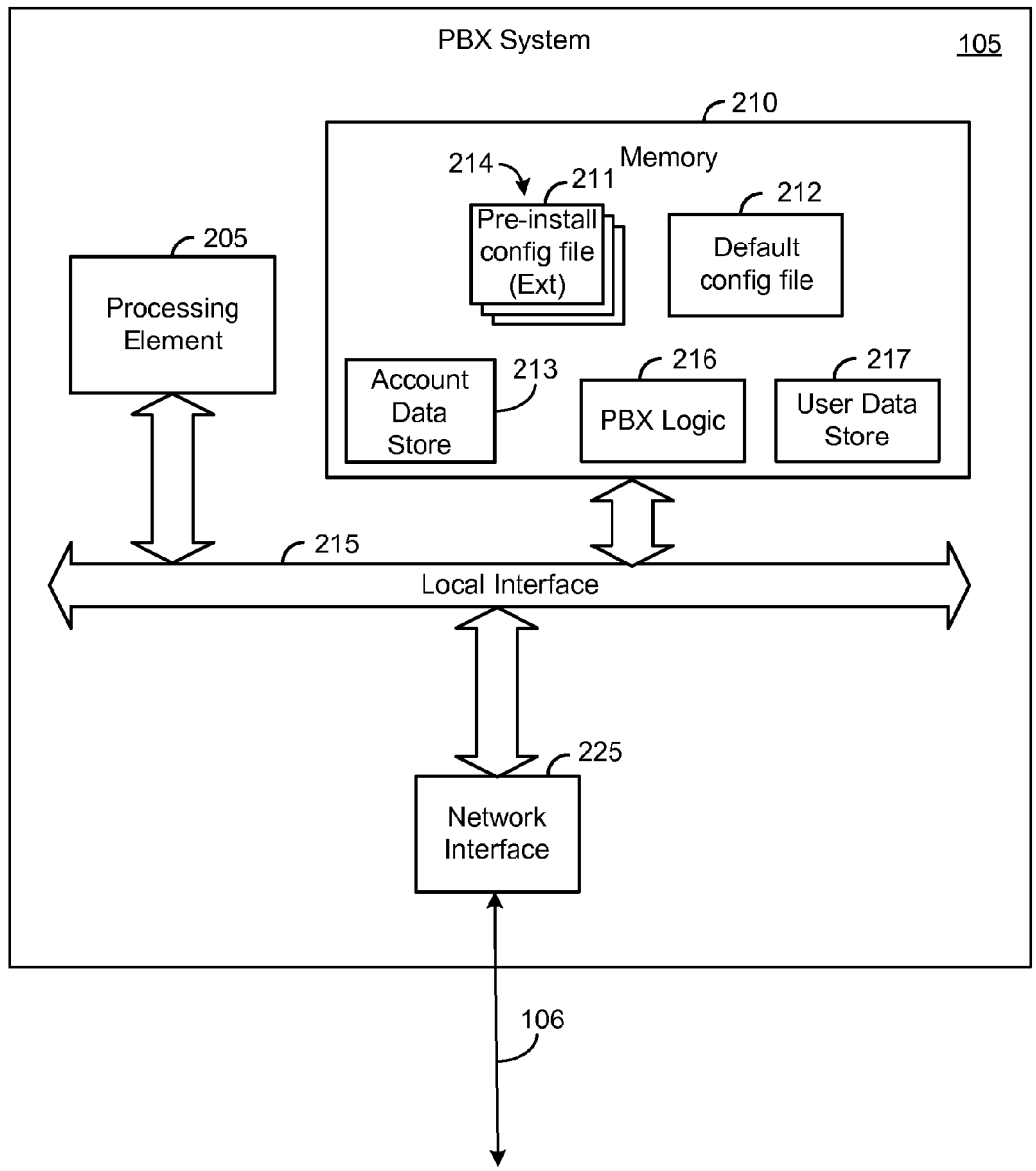
FIG. 2 shows an exemplary embodiment of a PBX system when in a first state prior to installation of one or more IP phones, in accordance with the disclosure.

FIG. 2 shows an exemplary embodiment of the PBX system 105 when placed in a first state prior to installation of one or more IP phones, in accordance with the disclosure. It should be understood that in this exemplary embodiment, only a few functional elements of the PBX system 105 are shown. However in other embodiments, some of these elements may be excluded and/or different elements may be provided.

The PBX system 105 includes a network interface 225, a memory 210, and a processing element 205. The processing element 205 can be a digital signal processor (DSP), a central processing unit (CPU), or any other suitable computing element that communicates with, and drives, the other elements within the PBX system 105, via a local interface 215 that can include at least one bus.

The network interface 225 can be used to communicatively couple the PBX system 105 to the switch 110 (shown in FIG. 1) via the communication link 106. The network interface 225 may include a number of ports, such as, for example, a number of Ethernet ports, that may be used to communicatively couple the PBX system 105 to various devices (not shown) in addition to the IP phones that are shown in FIG. 1.

The memory 210 that is also a part of the PBX system 105 can be implemented using any suitable computer-readable storage medium that can be accessed by the processing element 205 for executing one or more procedures in accordance with the disclosure. In this exemplary embodiment, when the PBX system 105 is in the first state (prior to installation of one or more IP phones in accordance with the disclosure), the memory 210 contains PBX logic 216, a set of pre-installation configuration files 214, data 213, referred to herein as "pre-installation data store," a default configuration file 212, and data 217, referred to herein as "user data store." In one exemplary implementation, the default configuration file 212 is designated by a string of twelve zeroes together with an appended ".cfg" extension (i.e. "000000000000.cfg").

The PBX logic 216 may implement various types of servers such as a DCHP server and a SIP server. As known in the art, a DCHP server provides IP related functions, such as, for example, providing IP addresses to elements of a communication system 100. Also, as known in the art, a SIP server handles SIP messaging and performs various tasks within a PBX system, including processes related to installation, such as generating configuration files in response to SIP registration messages, as will be described in more detail below. The PBX system 105 may perform other types of functions as well, such as address resolution protocol (ARP) functions and other types of functions typically employed in a conventional PBX system.

Though the PBX logic 216 is shown in this exemplary embodiment as being contained inside memory 210 in the form of code, it should be understood that in other embodiments, the PBX logic 216 can be implemented in hardware, software, or a combination of hardware and software.

The account data store 213 can be used to store pre-installation information of one or more users. In one exemplary embodiment, the account data store 213 is configured to store a set of user names along with a corresponding set of extension identifiers and additional information such as for example, password information, user ID, and a status identifier (such as, for example, "install," "user," and "hotdesk"). Note that the term "hotdesk" generally refers to a mode of operation that allows a phone to be temporarily used by multiple users over time. In such configuration, a user may log into a given IP phone and have the phone temporarily configured according to the pre-install configuration file 211 that is correlated with his or her extension identifier. Such feature may be beneficial to allow a user to utilize a secondary phone other than his or her primary phone such that this secondary phone has a similar configuration relative to his or her primary phone. The "user" state generally refers to a state after the post-install configuration files have been generated for a given phone, as will be described in more detail hereafter, and the "install" state generally refers to a state when the phone is expecting an install procedure to be performed in order to generate such post-install configuration files.

In one example, the account data store 213 includes a first entry indicating a username "JohnD" correlated with an extension identifier "1234," and a second entry indicating a username "Mary_ann" correlated with an extension identifier "1235." In this case, when the PBX system 105 is in the first state, an "install" status identifier may be inserted into each respective entry the usernames because the respective users are new users who have not yet connected and installed their IP phones on the PBX system 105.

The status identifiers for these two usernames, as well as any other usernames, can be changed later to a different status such as "user" after one or more users have interacted with the PBX system 105 as described below in more detail with respect to the PBX system 105 placed in a second state.

The user data store 217 indicates user-specific information that can be used by the PBX logic 216 to forward calls and other functions. As an example, generally, for each user, the user data store 217 associates the user's extension with the IP address and MAC address of the user's IP phone. As indicated above, this association is conventionally performed via user input, such as an administrator who is accessing the PBX system 105 through a GUI. However, as will be described in more detail hereafter, the PBX system 105 is configured to automatically learn the MAC address such that the association between the MAC address and extension identifier is performed during installation without the user having to manually provide the phone's MAC address.

The set of pre-installation configuration files 214 comprises a certain number of configuration files that may be based on a certain number of parameters such as for example, designated extension identifiers, user IDs etc. that are stored in the account data store 213. For example, the set of pre-installation configuration files 214 can include a first pre-installation configuration file 211 corresponding to a first extension, and an additional other number other substantially similar files, such as nineteen other similar files if it is desired that twenty unique extensions (each having a unique user ID) is to be provided. Each of the twenty user IDs is designated for use by a respective one of the twenty users who are authorized to install or use an IP phone on the PBX system 105.

Typically, the respective MAC addresses of each of the IP phones are not known when the set of pre-installation configuration files 214 are stored in the memory 210. This situation can arise for example, when it is expected that employees are to be hired in a company that uses the communication system 100 incorporating the PBX system 105. The employees may not necessarily be hired at the same time and/or all of the IP phones may not be purchased from a seller right away.

Furthermore, each of the employees may be provided with a different type or model of an IP phone, and even when the same model is provided to all employees, some employees (for example, managers) may be provided certain telephone privileges or features that are denied to other employees. It is also desirable that each of the IP phones be installable, possibly at different times, by each individual employee in an automatic manner without the need for a skilled installer to manually update/provide information in the PBX 105. The automatic installation process will be described below in further detail using FIG. 3 in conjunction with FIG. 2.

In one exemplary embodiment, the filename of each pre-install configuration file includes the respective extension identifier ("Ext.") of the extension to which the file pertains. Thus, a particular pre-install configuration file can be located and retrieved by searching the filenames of the file set 214 for the desired extension identifier, as will be described in more detail below.

Figure 3:
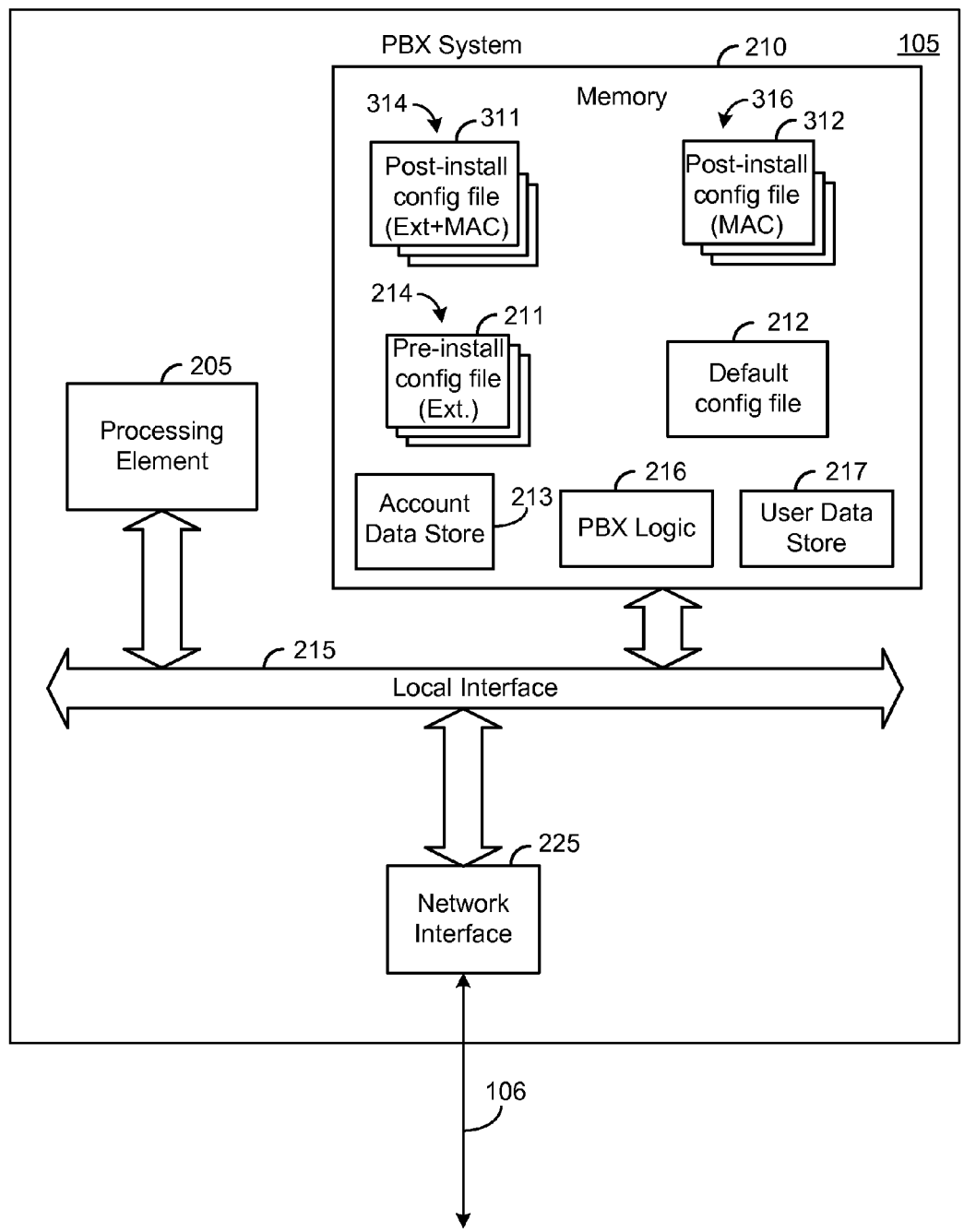
FIG. 3 shows an exemplary embodiment of a PBX system when in a second state after installation of one or more IP phones, in accordance with the disclosure.

FIG. 3 shows an exemplary embodiment of the PBX system 105 when placed in a second state after installation of one or more IP phones in accordance with the disclosure. Attention is particularly drawn to the memory 210 which not only contains the set of pre-installation configuration files 214, the account data store 213, and the default configuration file 212, but now further contains a first set of post-installation configuration files 314 and a second set of post-installation configuration files 316. Each of the files in these two sets of files constitutes a personalized configuration file containing information that is unique to each user. More particularly, in an exemplary implementation, each of the files contained in the first set of post-installation configuration files 314 may be identified using an "extn_mac.cfg" filename format that uses a combination of a unique extension identifier and a unique MAC address associated with a respective user. That is, the filename of each of the files 314 includes a respective MAC address of a given IP phone that has been registered with the PBX system 105 and the corresponding extension identifier for the same IP phone. Thus, a particular post-install configuration file correlated with a particular IP phone can be located by searching the files 314 for the phone's MAC address and/or extension identifier. Each of the files contained in the second set of post-installation configuration files 316 may be identified using a "mac.cfg" filename format that is based on the unique MAC address of an IP phone associated with a specific user. That is, the filename of each of the files 316 includes a respective MAC address of a given IP phone that has been registered with the PBX system 105. Thus, a particular post-installation configuration file correlated with a particular IP phone can be located searching the files 316 for the phone's MAC address.

The nature of the post-installation configuration files 314 and 316 stored in the memory 210 will now be described in more detail. Towards this end, attention is drawn to FIGS. 1-3 and furthermore as a matter of convenience, to the scenario described above pertaining to the twenty employees.

A first employee may, at a first instant in time, insert a connector of his/her IP phone, say the IP phone 115, into a wall socket that is coupled to communication link 107. The switch 110 communicatively interacts with the IP phone 115 and the PBX system 105 in order to provide a communicative coupling of the IP phone 115 to the PBX system 105. In a traditional configuration, such a mode of operation involves various activities wherein a variety of messages are transmitted back and forth between the IP phone 115, the switch 110, and the PBX system 105. These messages are typically in conformance to various industry standards. For example, in one traditional implementation, one or more messages that are formatted in accordance with session initiation protocol (SIP) may be used with certain standardized information being transmitted in a user agent (UA) field of the one or more SIP messages.

Once the switch 110 has provided communicative coupling between the IP phone 115 and the PBX system 105, the IP phone 115 retrieves the default configuration file 212, which is used by the phone 115 to configure its settings according to a default configuration indicated by the file 212 and possibly other configuration files that are identified by the file 212 and requested by the IP phone 115 based on the file 212. Note that this default configuration file 212 is provided to each IP phone that has yet to register with the PBX 105 such that there are no configuration files in the PBX 105 identified by the phone's MAC address.

The default configuration file 212 is defined such that the IP phone 115, when configured according to the default configuration file 212, registers with the PBX system 105 in an unconfigured state. That is, the IP phone 115 transmits an SIP registration message without any extension identifier to the PBX system 105. In response, the PBX logic 216 registers the IP phone 115 in an unconfigured state. As known in the art, when an IP phone is registered in an unconfigured state, the PBX system 105 provides a less than full set of functionality to the IP phone 115. In this regard, the PBX system 105 does not associate the IP phone 115 with a specific extension identifier that is reachable by other phones. Thus, a call cannot be placed to the IP phone 115 while it is registered in this unconfigured state. However, the PBX system 105 does permit emergency calls (e.g., "911" calls) to be placed from the IP phone 115.

In addition, the default configuration file 212 is further defined such that the IP phone 115, while in the unconfigured state, renders (e.g., displays) a graphical user interface via a display device (e.g., a liquid crystal display) on the phone 115 prompting the user to input various personalized information, such as the user's extension identifier and a password. In one exemplary embodiment, the user interface rendered by the phone 115 is the same user interface that may be used to prompt a user for the same information in order to place an IP phone in a hotdesk mode of operation by a user who has already registered another IP phone with the PBX 105. That is, messaging schemes and user interfaces conventionally used for receiving input to communicate with the PBX system 105 and initiate a hotdesk session may be leveraged to initiate an install procedure, as will be described in more detail hereafter. However, other types of user interfaces and message schemes may be used if desired. In addition, if desired, non-visual prompts, such as audio prompts may be used to prompt a user to enter the desired information.

The default configuration file 212 is also arranged such that the IP phone 115, when configured according to the default configuration file 212, transmits a certain SIP registration message when a user provides his or her personalized information in response to the prompt, as will be described in more detail hereafter. In this regard, as described above, the IP phone 115 prompts a user to provide personalized information, which in one embodiment includes the user's extension identifier and password. In response, the IP phone 115 transmits to the PBX 105 one or more SIP registration messages that have a UA field in which various information (e.g., extension identifier and password) can be inserted. In addition, according to the default configuration provided by the default configuration file 212, the IP phone 115 also inserts into the UA field the MAC address of the phone 115, thereby permitting the PBX 105 to automatically learn the phone's MAC address, as will be described in more detail below.

In this regard, when the SIP registration message is received by the PBX 105, the PBX logic 216 uses the extension identifier and the password to authenticate the user. If the user is authenticated, the PBX logic 216 is configured to update the user data store 217 so that the phone's MAC address is correlated with its extension identifier and IP address in the user data store 217. After the installation process is complete, the PBX logic 216 may use the user data store 217 to forward calls to the IP phone 115 or perform other functions. As an example, when the PBX system 105 receives a packet that has the phone's MAC address as the packet's destination MAC address, the PBX logic 216 may forward the packet to the IP phone 115 based on the user data store 217.

If the user is authenticated based on the SIP registration message, as described above, the PBX logic 216 also uses the extension identifier from the SIP registration message to find the pre-install configuration file 211 that is correlated with such extension identifier. In one embodiment, the filename of the file 211 includes the extension identifier, and the file 211 is located by matching a portion of the filename to the extension identifier from the SIP registration message. Such file 211 includes configuration settings that may be used to configure an IP phone according to the preferences desired for the user associated with the file's extension identifier, and the file 211 identifies other configuration files that may be retrieved from the PBX system 105 for configuring the IP phone associated with the file's extension identifier in a desired manner.

After finding and accessing the pre-install configuration file 211 associated with the extension identifier from the SIP registration message, the PBX logic 216 is configured to generate a post-install configuration file 311 for the IP phone 115 being installed. Such file 311 may be a copy of the foregoing pre-install configuration file 211 except that the filename of the newly-created file 312 includes the MAC address of the IP phone 115 and the extension identifier provided by the user. In other embodiments, there may be differences between the foregoing files 211 and 311. Such file 311, like the pre-install configuration file 211, defines various configuration settings for the IP phone 115. As an example, the file 311 may define button mappings for the IP phone 115. As known in the art, a "button mapping" generally refers to a mapping that maps a given button of a phone to a particular function that is to be performed when the button is pressed or otherwise selected by a user.

Based on the pre-install configuration file 211, the PBX logic 215 is configured also to generate a post-install configuration file 312 for the IP phone 115 being installed. The post-install configuration file 312 indicates locations of other configuration files to be provided to the IP phone 115 for controlling its configuration settings. In one embodiment, the filename of the post-install configuration file 312 is controlled to include the MAC address of the IP phone 115 being installed.

Furthermore, the PBX system 105 updates the account data store 213 to change the status identifier in the phone's entry from "install" to "user," thereby indicating the post-installation configuration files 311 and 312 for the phone 115 have been generated and are available.

The newly generated configuration files 311 and 312 are transmitted to the IP phone 115, which is configured according to these configuration files 311 and 312. Thus, the IP phone 115 is configured according to user-specific settings that have been defined in the PBX system 105 for the extension that is associated with a given user.

Note that such user, referred to hereafter as "User A," may thereafter go to an unregistered IP phone (i.e., an IP phone in an unregistered state), such as IP phone 120, for example, and operate the phone 120 in a hotdesk mode of operation. In this regard, the process described above is repeated for the IP phone 120 such that the IP phone is configured according to the default configuration file 212. Thus, the IP phone 120 displays a prompt at least for a user's extension identifier and password. Upon receiving such input, the IP phone 120 transmits a hotdesk request including the extension identifier and password entered by the user. In this example, the status indicator for the entry of the account data store 213 may be manipulated to indicate that the IP phone 120 is in a hotdesk mode of operation. In such case, after receiving the hotdesk request, the PBX logic 216 uses the extension identifier from the hotdesk request to find the pre-install configuration file 211 that is identified by the extension identifier (and which was previously used to generate the post-install configuration files 311 and 312 for configuring the IP phone 115). The PBX logic 216 transmits such configuration file 211 to the IP phone 120, which is temporarily configured according to such file 211 in the hotdesk mode of operation. Thus, at least temporarily, the IP phone 120 is configured similar to the IP phone 115 such that it has a similar look and feel, including button mappings, relative to the IP phone 115. Once User A has finished using the IP phone 120 or once the hotdesk session otherwise expires, User A may log out of the IP phone 120 at which point the configuration of the IP phone 120 is returned to that indicated by the default configuration file 212.

Note that the process described above with reference to installing the first IP phone 115 on the PBX system 105 may be repeated as and when the other employees couple their respective IP phones into the switch 110 and provide their extension identifiers. Understandably, each of the IP phone 115, the IP phone 120, and IP phone 125 has a unique MAC address, and each of these IP phones may be similar or dissimilar to each other or different in terms of features, capabilities, manufacturer, model number, type etc.

Figure 4A:
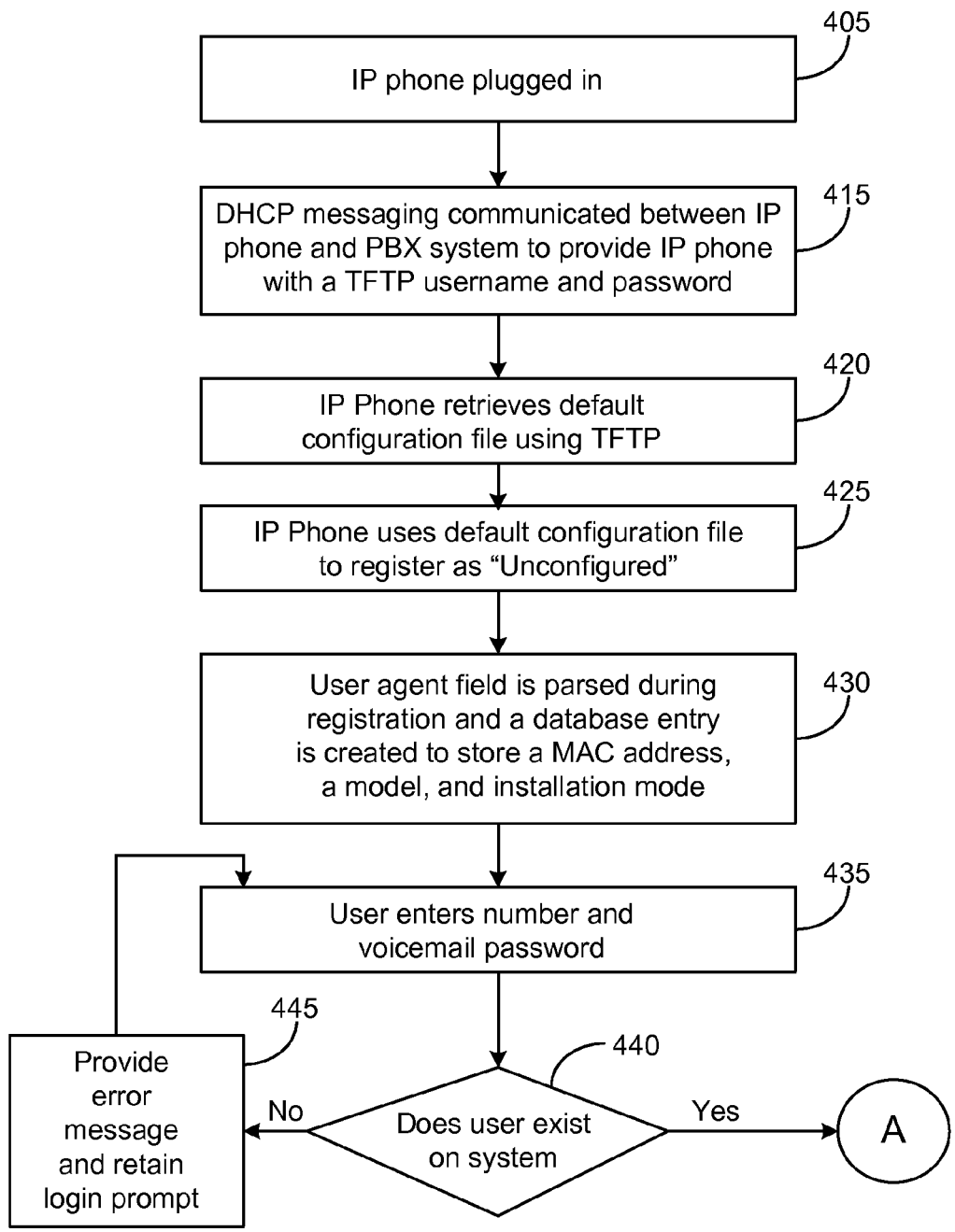
FIGS. 4A and 4B show a flowchart of an exemplary method for installing an IP phone in accordance with the disclosure.
Figure 4B:
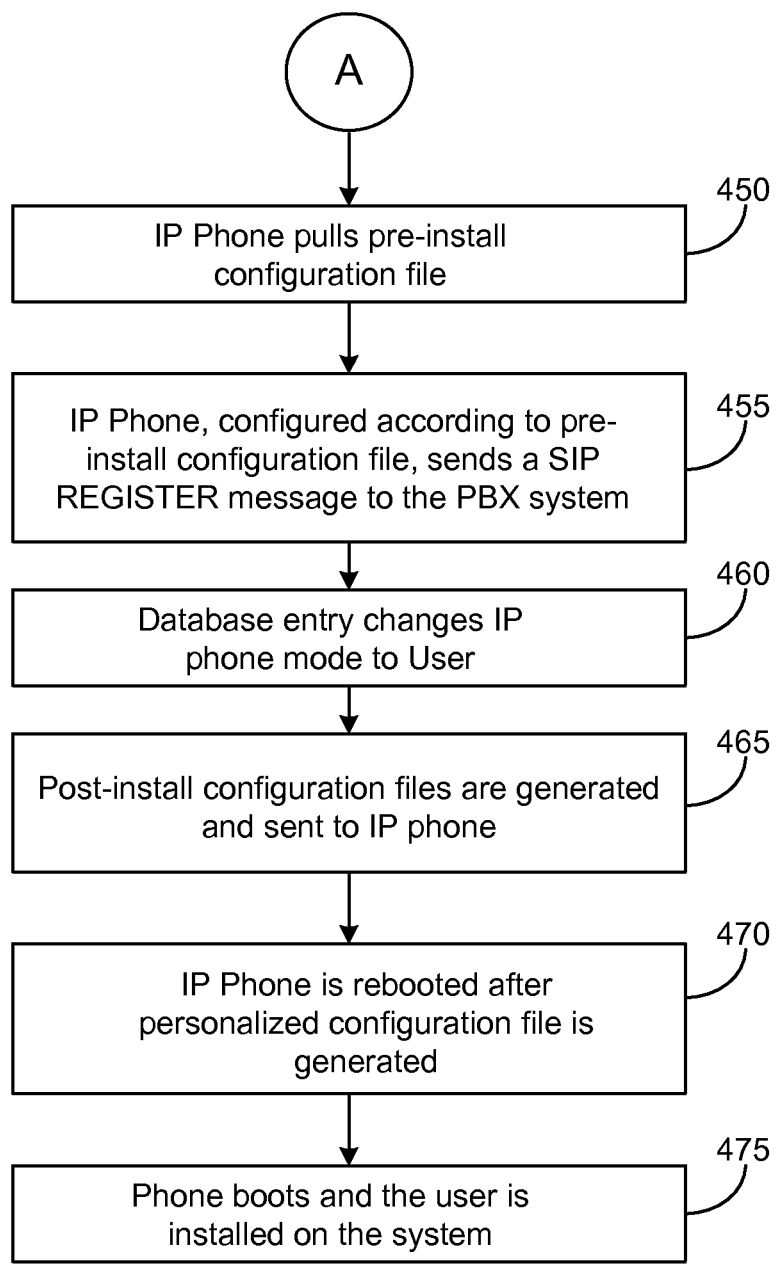
Figure 5:
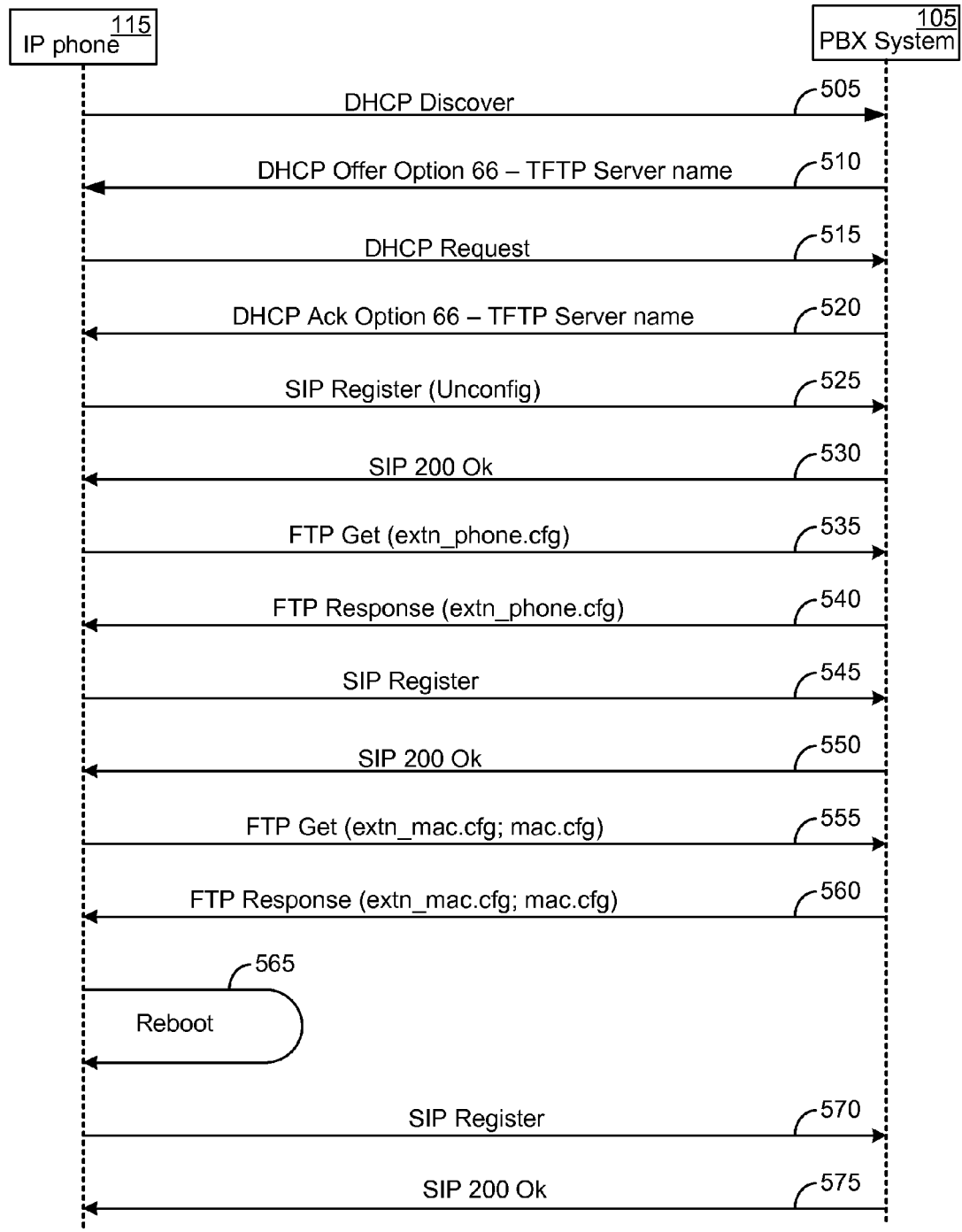
FIG. 5 shows a ladder diagram of interactions between a PBX system and an IP phone for installing an IP phone on the PBX system in accordance with the disclosure.

Attention is now drawn to FIGS. 4A and 4B, which show a flowchart of an exemplary method for installing an IP phone in accordance with the disclosure. Further, FIG. 5 shows a ladder diagram of a messaging scheme that may be used to implement the method depicted by the flowchart in FIGS. 4A and 4B.

In block 405 of FIG. 4A, an IP phone, such as the IP phone 115 described above, is plugged into a telephone wall socket, thereby coupling the IP phone to the switch 110. In block 415, various DHCP message 505, 510, 515, and 520 are exchanged between the IP phone 115 and the PBX 105 in order for the IP phone 115 to acquire an IP address, as well as a temporary file transfer protocol (TFTP) username and password, via techniques known in the art.

In block 420, the username and password are used to retrieve the default configuration file ("000000000000.cfg") 212 (shown in FIG. 2). The IP phone 115 uses the default configuration file 212 to configure its settings so that it may communicate SIP messages with the PBX 105 for registration.

In this regard, in block 425, the default configuration file 212 is used to generate an SIP registration message 525 for registering the IP phone 115 with the PBX system 105, as an "unconfigured" phone. The MAC address of the IP phone 115 (as well as other information, such as model and firmware version of the IP phone 115) may be transmitted to the PBX system 105 in the user agent field of the SIP message 525. In block 430, the PBX system 105 parses the user agent field of the SIP registration message 525 to obtain the MAC address of the IP phone 115, as well as the model and firmware version of the IP phone 115, and such information is stored in a new entry of the account data store 213. In such entry, a status indicator is stored indicating that the IP phone 115 is in the install mode. After successfully processing the SIP registration message 525, the PBX logic 216 transmits an SIP reply message 530 indicating that the message 525 has been successfully received and processed. At this point, the IP phone 115 is displaying a user interface prompting a user to enter an extension and password for installation.

In block 435 the user responds to such prompt by inputting to the phone 115 an extension identifier ("1235," for example)

and a password. In response, a message 535, such as an FTP GET message, having in its UA field at least the extension identifier and password entered by the user, as well as the MAC address of the IP phone 115, is transmitted from the IP phone 115 to the PBX 105 for requesting retrieval of the pre-install configuration file 211 that is associated with the entered extension identifier. Upon receiving the message 535, the PBX logic 216 checks the extension identifier and password against predefined extension identifier and password pairs stored at the PBX 105 in order to authenticate the user. If the authentication fails, an error message is provided and the authentication prompt (a login prompt, for example) is re-indicated (block 445).

On the other hand, if the authentication is successful, the user is validated, and an installation procedure is performed. In this regard, the PBX logic 216 updates the user data store 217 in order to associate the phone's MAC address with the phone's IP address and extension identifier. The PBX logic 216 also searches for the pre-install configuration file 211 having the extension identifier of the message 535 in its filename. After locating such pre-install configuration file 211, the PBX logic 216 transmits such configuration file 211 to the IP phone 115 in a message 540, such as an FTP response message, and the IP phone 115 uses information from the pre-install configuration file 211 to transmit an SIP registration message 545 in block 455. In this regard, the information from the pre-install configuration file 211 includes various parameters, such as the SIP server address to be used for installation and authentication information, such as username and password, used by the identified SIP server of the PBX logic 216 for authenticating the user.

The SIP registration message 545 transmitted in block 455 has in its UA field at least the extension identifier entered by the user in block 435. In response, the PBX logic 216 finds the pre-install configuration file 211 based on the extension identifier in the SIP registration message and uses this file 211 to generate a post-install configuration file 311 (which has the phone's MAC address and extension identifier in its filename) and a post-install configuration file 312 (which has the phone's MAC address in its filename). The PBX logic 216 also updates the account data store 213 to change the phone's status indicator from install mode to user mode indicating that the post-install configuration files 311 and 312 for this phone 115 have been generated. Thereafter, the PBX logic 21 transmits to the IP phone 115 an SIP message 550 indicating that the SIP registration message 545 transmitted in block 455 has been successfully received and processed.

After receiving such message 550, the IP phone 115 transmits to the PBX 105 a message 555, such as an FTP GET message, requesting retrieval of the post-install configuration files 311 and 312. Such message 555 includes at least the extension identifier and MAC address of the IP phone 115. Using the extension identifier and MAC address of the FTP GET message 555, the PBX logic 216 retrieves the post-install configuration files 311 and 312 and transmits these files 311 and 312 to the IP phone 115 via at least one reply message 560, such as an FTP response message. The IP phone 115 then uses these configuration files 311 and 312 to configure its settings, such as button mappings and other types of a parameters and functions, as may be desired and indicated by the files 311 and 312. After updating its configuration based on the files 311 and 312, the IP phone 115 reboots 565 (FIG. 5) such that the new configuration indicated by the downloaded files 311 and 312 is implemented by the IP phone 115. After rebooting, the IP phone 115 transmits an SIP registration message 570 to which the PBX logic 216 responds with an SIP message 575 indicating that the SIP registration message 570 has been successfully received and processed. At this point, the IP phone 115 has been installed with the PBX system 105 and has been configured according to the post-install configuration files 311 and 312 correlated with the phone's MAC address. Note that the installation process is complete without the user of the phone 115 having to input a MAC address and such that a phone 115 with any MAC address may be installed. In this regard, the PBX system 105 automatically learns the IP phone's MAC address such that it is unnecessary to ensure that an IP phone with a certain MAC address is used for the install.

Figure 6:
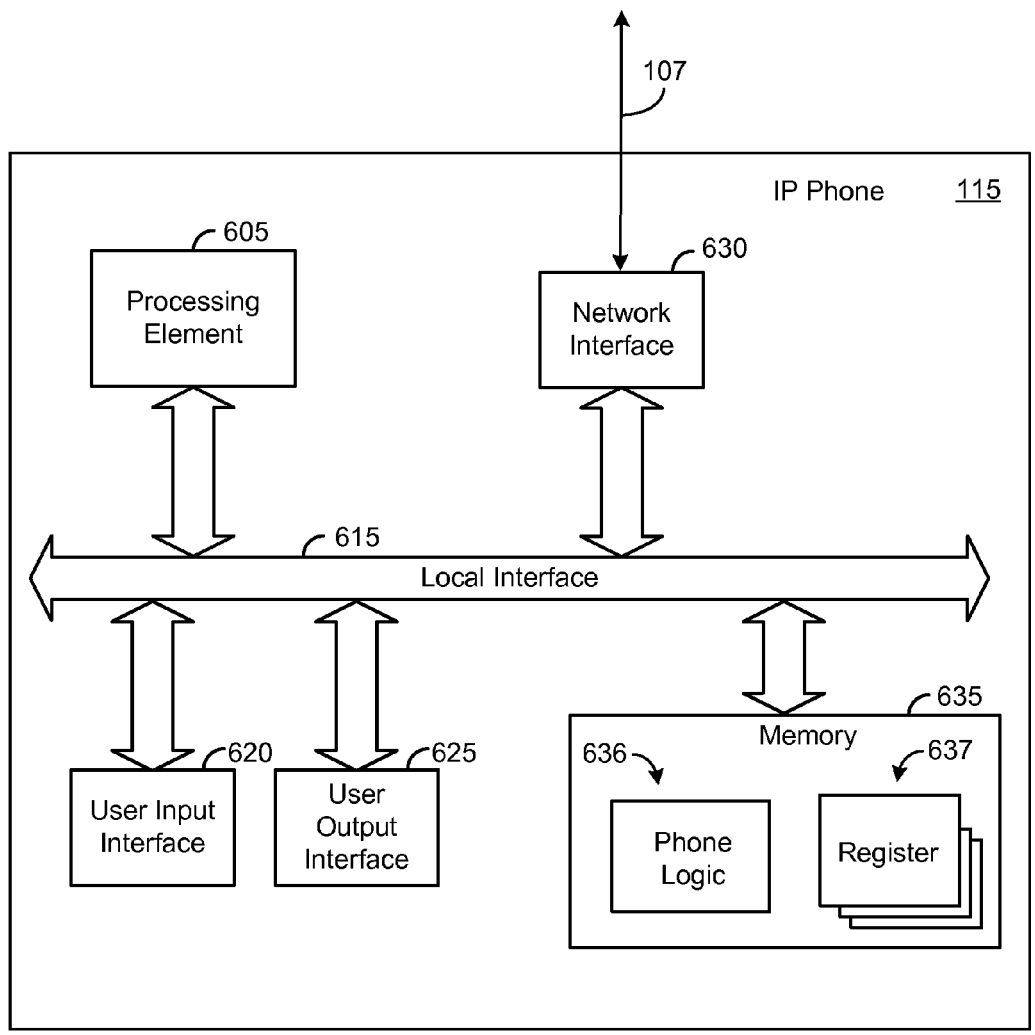
FIG. 6 shows an exemplary embodiment of an IP phone configured in accordance with the disclosure.

Attention is now drawn to FIG. 6, which shows an exemplary embodiment of an IP phone 115 configured in accordance with the disclosure. It should be understood that the description provided herein with respect to the IP phone 115 is equally pertinent to each of other IP phones, such as the IP phone 120 or the IP phone 125 shown in FIG. 1. The IP phone 115 includes a processing element 605, a network interface 630, a user input interface 620, a user output interface 625, and a memory 635.

The processing element 605 can be a digital signal processor (DSP), a central processing unit (CPU), or any other suitable computing element that communicates with and drives the other elements within the IP phone 115 via a local interface 615 that can include at least one bus. The network interface 630 can be used to communicatively couple the IP phone 115 to the switch 110 (shown in FIG. 1) via the communication link 107.

The user input interface 620 can be, for example, a keypad and/or a microphone, which allows the user to input values and audio signals into the IP phone 115. The user output interface 625 can be, for example, a speaker, and/or a light-emitting diode (LED) or a liquid crystal display (LCD) screen that allows the user to receive audio and visual signals from the IP phone 115.

The memory 635 can be implemented using any suitable computer-readable storage medium that can be accessed by the processing element 605 for executing one or more procedures in accordance with the disclosure. In this exemplary embodiment, the memory 635 includes phone logic 636, and a set of registers 637. The set of registers 637, which may be just one register or multiple registers in various embodiments, can be used to store various types of information associated with the IP phone 115.

The phone logic 636 is shown as implemented in software and stored in memory 635. However, in other embodiments, the phone logic 637 implementing in hardware, software, or any combination thereof. The phone logic 636 can be configured to communicate with the switch 110 and the PBX system 105 via the network interface 630 in order to receive information from the PBX system 105, such as information from the configuration files described above, that may then be stored in the set of registers 637. Further, the phone logic 636 may use in the stored information to control the operation of the IP phone 115. As an example, when a user presses a button of the user input interface 620, the phone logic 636 may be configured to check the button mappings stored in the registers 637 in order to determine the operations to be performed in response to button press. The general operation of the IP phone 115 is generally well known and will not be discussed in detail herein.

In summary, it will be pertinent to point out that the methods and systems described in the present disclosure may be implemented in hardware, software, firmware or combination thereof. Features described in the form of the various functional blocks or structures may be implemented together (e.g., in a logic device such as an integrated logic device, or in a circuit board) or separately (e.g., as separate logic devices or separate circuit boards) that operate cooperatively with software stored in memory. The software portion of the methods of the present disclosure may be stored in one or more computer-readable storage mediums, each of which comprises instructions that, when executed, perform, at least in part, the described operations and methods. The computer-readable storage medium, which excludes signals, may comprise, for example, a random access memory (RAM) and/or a read-only memory (ROM). The instructions may be executed by a processing element which can include a processor (e.g., a digital signal processor (DSP), an application specific integrated circuit (ASIC), or a field programmable logic array (FPGA)).

It will be also understood that the various embodiments described in the disclosure are directed at providing an understanding of the disclosure, and various modifications and alternative implementations can be derived by persons of ordinary skill in the art. For example, various exemplary protocols and messaging schemes are described above for illustrative purpose, but other types of protocols and messaging schemes may be used in other embodiments as may be desired. Various other modifications and changes would be apparent to a person of ordinary skill upon reading this disclosure.

Now, therefore the following is claimed:

1. A communication system, comprising:
   an Internet protocol (IP) phone; and
   a private branch exchange (PBX) system communicatively coupled to the IP phone, the PBX system configured to store a default configuration file for configuring the IP phone to prompt a user to enter an extension identifier for the IP phone and for configuring the IP phone to transmit the extension identifier and a media access control (MAC) address of the IP phone to the PBX system in at least one registration message, the PBX system configured to automatically learn the MAC address by associating the MAC address with the extension identifier in data in response to the at least one registration message, the PBX system configured to access, based on the extension identifier from the at least one registration message, a first configuration file stored by the PBX system and identified by the extension identifier, the PBX further configured to generate, based on the first configuration file, a second configuration file for configuring the IP phone, wherein the second configuration file is identified by the MAC address, and wherein the IP phone is configured to retrieve the second configuration file from the PBX system based on the MAC address and to configure itself based on the second configuration file.

2. The communication system of claim 1, wherein the second configuration file defines button mappings for the IP phone.

3. The communication system of claim 1, wherein the IP phone is configured to retrieve the default configuration file from the PBX system using temporary file transfer protocol (TFTP).

4. The communication system of claim 1, wherein the IP phone is configured according to the default configuration file to register with the PBX system in an unconfigured state.

5. The communication system of claim 1, wherein the PBX system is configured to forward calls to the IP phone based on the data.

6. The communication system of claim 1, wherein the at least one registration message is formatted in accordance with session initiation protocol (SIP).

7. The communication system of claim 6, wherein the IP phone is configured according to the default configuration file to provide the MAC address in a user agent field of the at least one registration message.

8. The communication system of claim 1, wherein the first configuration file has a filename that includes the extension identifier.

9. The communication system of claim 1, wherein the second configuration file has a filename that includes the MAC address and the extension identifier.

10. The communication system of claim 1, wherein the PBX system is configured to store a plurality of configuration files based on a plurality of extension identifiers, each configuration file of the plurality of configuration files corresponding to a respective extension identifier of the plurality of extension identifiers, and wherein the plurality of configuration files includes the first configuration file.

11. The communication system of claim 1, wherein the default configuration file configures the IP phone to render a graphical user interface using a display device of the IP phone to prompt the user to enter the extension identifier for the IP phone.

12. The communication system of claim 1, wherein the PBX system is configured to generate, based on the first configuration file, a third configuration file for configuring the IP phone, and wherein the IP phone is configured to retrieve the third configuration file from the PBX system based on the MAC address and to configure itself based on the third configuration file.

13. A communication method, comprising:
   transmitting a default configuration file to an Internet protocol (IP) phone from a private branch exchange (PBX) system;
   configuring the IP phone, based on the default configuration file, to prompt a user for an extension identifier for the IP phone;
   configuring the IP phone, based on the default configuration file, to transmit the extension identifier and a media access control (MAC) address of the IP phone to the PBX system in at least one registration message;
   automatically learning the MAC address at the PBX system, the learning comprising associating the MAC address with the extension identifier in data in response to the at least one registration message;
   retrieving, from memory, a first configuration file based on the extension identifier from the at least one registration message;
   generating a second configuration file identified by the MAC address based on the first configuration file retrieved by the retrieving;
   transmitting the second configuration file from the PBX system to the IP phone; and
   configuring the IP phone based on the second configuration file.

14. The method of claim 13, further comprising configuring button mappings for the IP phone based on the second configuration file.

15. The method of claim 13, wherein the transmitting the default configuration file is performed using temporary file transfer protocol (TFTP).

16. The method of claim 13, further comprising configuring the IP phone, based on the default configuration file, to register with the PBX system in an unconfigured state.

17. The method of claim 13, further comprising forwarding calls via the PBX system to the IP phone based on the data.

18. The method of claim 13, further comprising configuring the IP phone, based on the default configuration file, to format the at least one registration message in accordance with session initiation protocol (SIP).

19. The method of claim 18, further comprising configuring the IP phone, based on the default configuration file, to provide the MAC address in a user agent field of the at least one registration message.

20. The method of claim 13, further comprising:
storing, in the PBX system, a plurality of configuration files based on a plurality of extension identifiers prior to the configuring the IP phone, based on the default configuration file, to prompt the user for the extension identifier for the IP phone, each configuration file of the plurality of configuration files having a filename that includes a respective extension identifier of the plurality of extension identifiers,
wherein the retrieving the first configuration file includes comparing a portion of the filename of each configuration file of the plurality of configuration files to the extension identifier from the at least one registration message.

21. The method of claim 13, wherein the configuring the IP phone includes rendering a graphical user interface using a display device of the IP phone to prompt the user to enter the extension identifier for the IP phone.

22. The method of claim 13, further comprising
generating, based on the first configuration file retrieved by the retrieving, a third configuration file identified by the MAC address;
transmitting the third configuration file from the PBX system to the IP phone; and
configuring the IP phone based on the third configuration file.

23. A private branch exchange (PBX) system, comprising:
memory for storing a default configuration file for configuring an Internet protocol (IP) phone to prompt a user to enter an extension identifier for the IP phone and for configuring the IP phone to transmit the extension identifier and a media access control (MAC) address of the IP phone to the PBX system in at least one registration message; and
logic configured to automatically learn the MAC address by associating the MAC address with the extension identifier in data in response to the at least one registration message, the logic configured to access, based on the extension identifier from the at least one registration message, a first configuration file stored in memory and identified by the extension identifier, the logic further configured to generate, based on the first configuration file, a second configuration file identified by the MAC address, the second configuration file for configuring button mappings for the IP phone.

* * * * *